United States Patent [19]
Kashiwagi

[11] Patent Number: 5,036,943
[45] Date of Patent: Aug. 6, 1991

[54] VEHICLE POWER TRAIN SYSTEM
[75] Inventor: Akihiro Kashiwagi, Hiroshima, Japan
[73] Assignee: Mazda Motor Corporation, Hiroshima, Japan
[21] Appl. No.: 503,845
[22] Filed: Apr. 3, 1990
[30] Foreign Application Priority Data Apr. 4, 1989 [JP] Japan ............................. 1-86666

[51] Int. Cl.$^5$ ............................................. B62D 21/04
[52] U.S. Cl. .................................... 180/380; 180/312; 180/381; 280/781; 296/204
[58] Field of Search ............... 180/300, 291, 297, 374, 180/375, 378, 379, 380, 381, 382, 312, 311; 296/204; 280/781

[56] References Cited

U.S. PATENT DOCUMENTS 3,167,149 1/1965 Miller et al. ................. 180/380

FOREIGN PATENT DOCUMENTS 1158265 12/1983 Canada .
2824241 12/1979 Fed. Rep. of Germany ...... 180/381
269721 11/1988 Japan ............................... 280/781
990809 5/1965 United Kingdom ............ 180/381

Primary Examiner—Mitchell J. Hill
Attorney, Agent, or Firm—Sixbey, Friedman, Leedom & Ferguson

[57] ABSTRACT

A power train system for a vehicle includes a power unit which is positioned in the front of the vehicle body, a differential which is positioned in the rear of the vehicle body, a propeller shaft which connects the power unit and the differential to transmit the engine output power to the rear wheels, and a power plant frame which rigidly connects the rear portion of the power unit and the front portion of the differential. The differential is resiliently connected to a chassis side member by a cylindrical rubber bushing member which has an outer tubular member fixed to the differential, a shaft member which is fixed to the chassis side member and extends horizontally in the transverse direction of the vehicle body, and a rubber member which is interposed between the outer tubular member and the shaft member. The rubber bushing member is positioned higher than the center of the differential, and the power plant frame has a substantially U-shaped cross-section which opens sideways and is flexurally stiff and torsionally flexible.

18 Claims, 6 Drawing Sheets

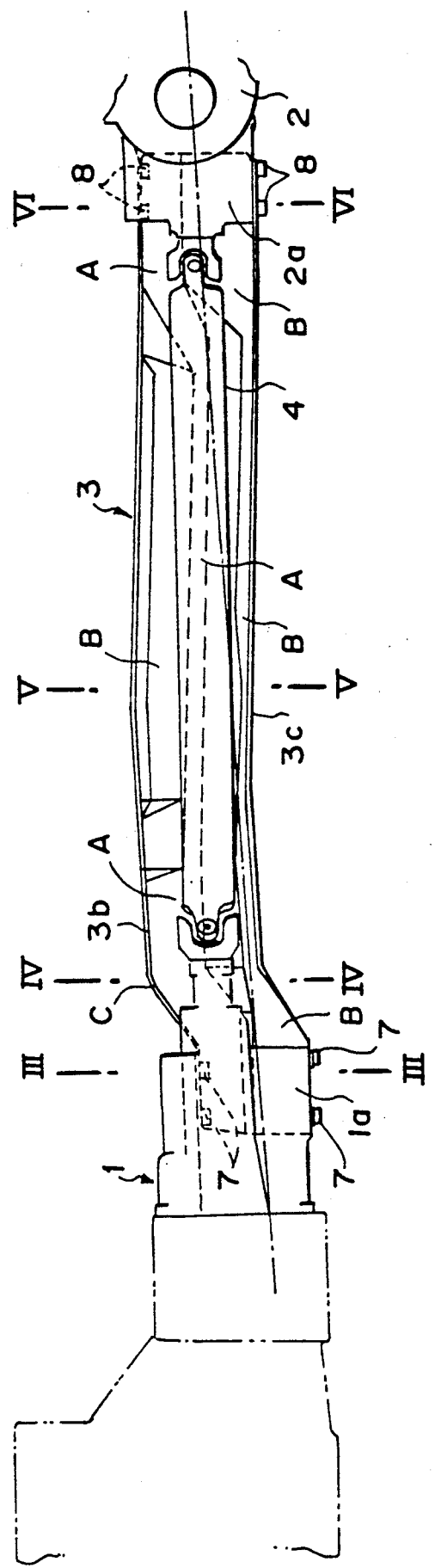
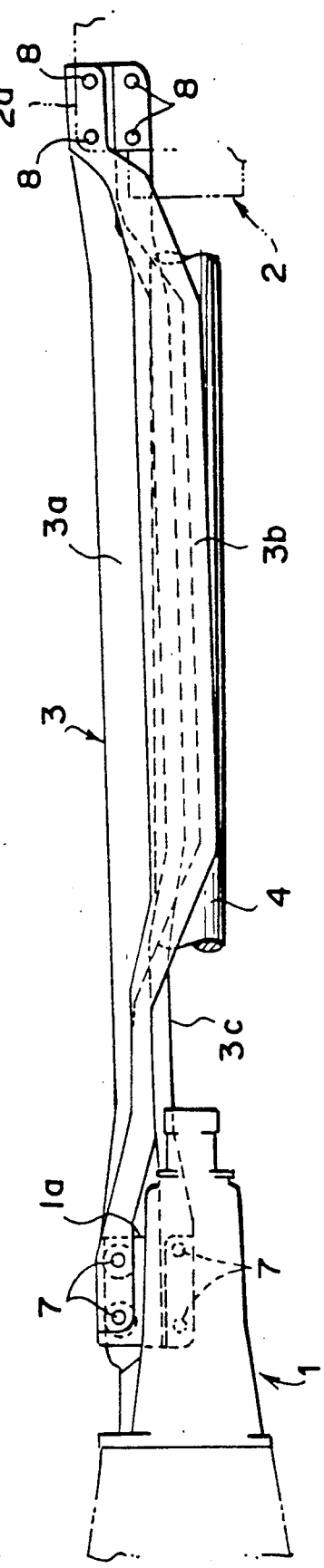

5,036,943

VEHICLE POWER TRAIN SYSTEM

BACKGROUND OF THE INVENTION

1. Field of the Invention

This invention relates to a power train system for a vehicle.

2. Description of the Prior Art

Recently it has been proposed to rigidly connect the power unit positioned in the front of the vehicle body to the differential positioned in the rear of the vehicle body by a power plant frame which has a substantially U-shaped cross-section and is flexurally stiff and torsionally flexible, thereby reducing the engine vibration and suppressing the windup vibration of the differential due to torque reactions from the rear wheels. See Canadian Patent No. 1158265, for instance.

However when the power unit and the differential are rigidly connected by the power plant frame, an impact acting in the longitudinal direction of the vehicle body upon collision or the like is directly transmitted to the differential or the power unit through the power plant frame and the impact cannot be sufficiently absorbed.

SUMMARY OF THE INVENTION

In view of the foregoing observations and description, the primary object of the present invention is to provide a power train system in which the engine vibration can be reduced and the windup vibration of the differential due to torque reactions from the rear wheels cab be suppressed and, at the same time, the impact acting in the longitudinal direction of the vehicle body upon collision or the like can be satisfactorily absorbed.

In accordance with the present invention, there is provided a power train system for a vehicle comprising a power unit which is positioned in the front of the vehicle body, a differential which is positioned in the rear of the vehicle body, and is resiliently connected to a chassis side member by at least one cylindrical rubber bushing member which comprises an outer tubular member fixed to the differential, a shaft member fixed to the chassis side member and extending horizontally in the transverse direction of the vehicle body, and a rubber member interposed between the outer tubular member and the shaft member, the rubber bushing member being positioned higher than the center of the differential, a propeller shaft which connects the power unit and the differential to transmit the engine output power to the rear wheels, and a power plant frame which rigidly connects the rear portion of the power unit and the front portion of the differential, the power plant frame having a substantially U-shaped cross-section which opens sideways and being flexurally stiff and torsionally flexible.

In the power train of the present invention, when an impact force is transmitted to the differential through the power plant frame upon an head-on collision of the vehicle, the differential swings downward about the cylindrical rubber bushing member since it is positioned higher than the center of the differential. This greatly stresses in bending the portion of the power plant frame near the connection of the power plant frame to the differential, and bends the power plant frame there, whereby the impact force is effectively absorbed.

In a preferred embodiment of the present invention, the power plant frame is provided with a bight portion near the connection to the differential so that it is doglegged in shape. When a longitudinal impact acts on the vehicle body upon collision, the power plant frame deforms and cracks at the bight portion, and accordingly, the power plant frame can be broken much more easily when the differential swings downward about the cylindrical rubber bushing member and stresses in bending the bight portion.

BRIEF DESCRIPTION OF THE DRAWING

FIG. 1 is a side view showing a power train system in accordance with an embodiment of the present invention, FIG. 2 is a plan view of the power train system.

DESCRIPTION OF THE PREFERRED EMBODIMENT

Figure 3:
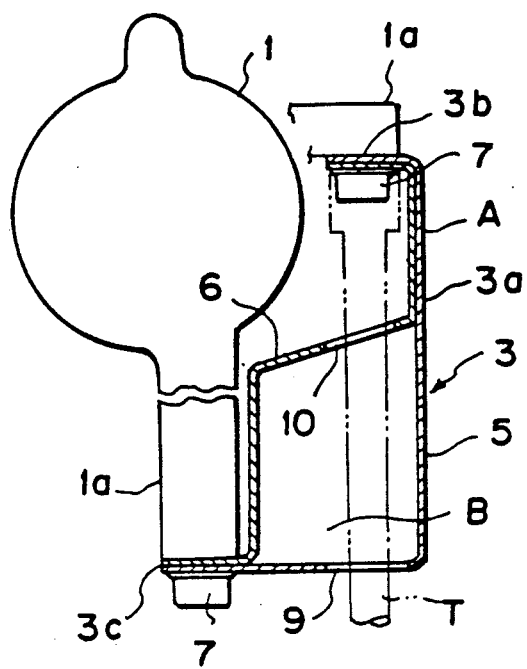
FIG. 3 is a cross-sectional view taken along line III—III in FIG. 1.

In FIGS. 1 and 2, a power train system in accordance with an embodiment of the present invention includes a power unit 1 (that obtained by unitizing an engine, a clutch and a transmission) which is positioned in the front of a vehicle body, a differential 2 which is positioned in the rear of the vehicle body and a power plant frame 3 which rigidly connects the power unit 1 and the differential 2. A propeller shaft 4 connects the power unit 1 and the differential 2 to transmit the engine output power to the rear wheels.

The power plant frame 3 is formed of inner and outer plate members 5 and 6 (FIG. 4) which are welded together, and comprises a vertical portion 3a, and upper and lower flange portions 3b and 3c which extend horizontally in the same direction respectively from the upper and lower edges of the vertical portion 3a. That is, the power plant frame 3 is substantially U-shaped in cross-section and opens sideways. The power plant frame 3 is flexurally stiff and torsionally flexible. The plate members 5 and 6 are welded together at the upper and lower flange portions 3b and 3c, at the upper half of the front and rear end portions of the vertical portion 3a and at the middle portion of the intermediate portion. The portions of the vertical portion 3a where the plate members 5 and 6 are welded together are indicated at A in FIGS. 1 to 6. Further the plate members 5 and 6 define closed cross-sections at the lower half of the front and rear end portions of the vertical portion 3a and at the upper and lower portions of the intermediate portion of the vertical portion 3a. The portions having a closed cross-section are indicated at B in FIGS. 1 to 6. With this arrangement, the flexural stiffness and the torsional flexibility of the power plant frame 3 are matched with each other as a whole.

Figure 4:
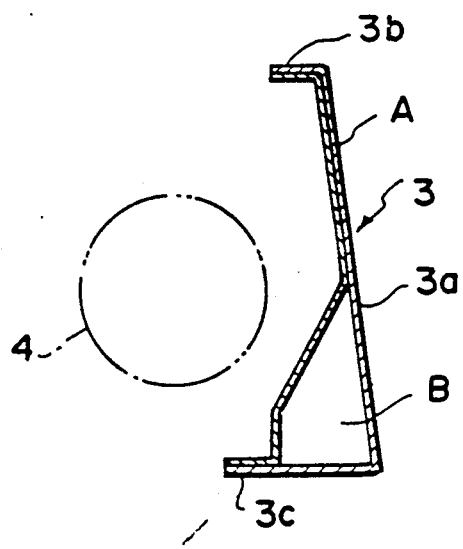
FIG. 4 is a cross-sectional view taken along line IV—IV in FIG. 1.
Figure 5:
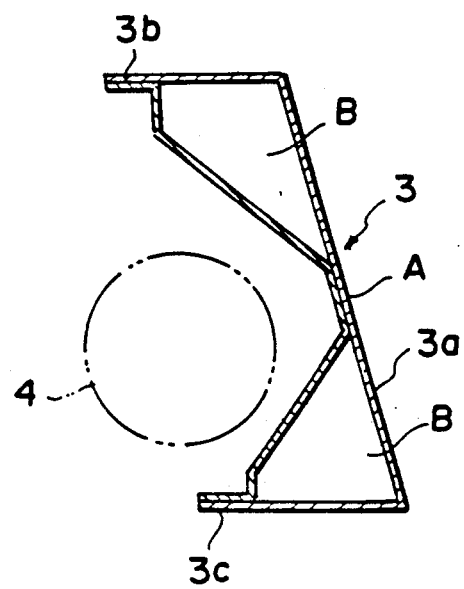
FIG. 5 is a cross-sectional view taken along line V—V in FIG. 1.
Figure 6:
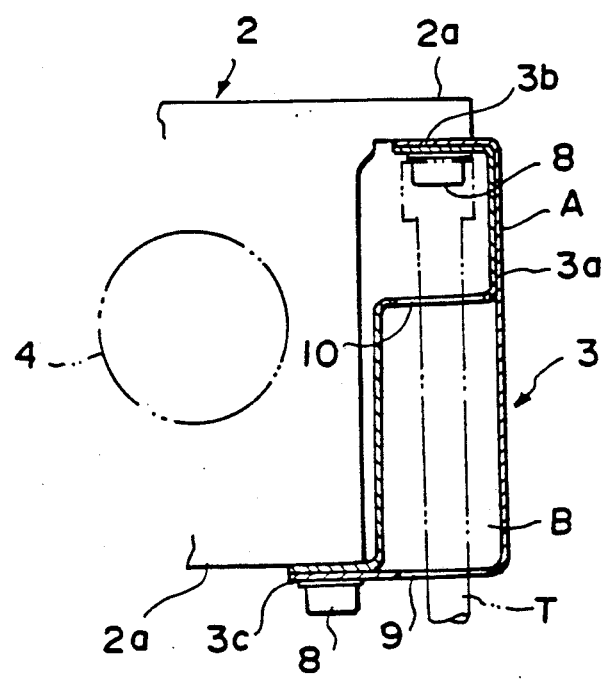
FIG. 6 is a cross-sectional view taken along line VI—VI in FIG. 1.

The front end portion of the power plant frame 3 is rigidly fixed to a mounting portion 1a of the power unit 1 by bolts 7 at the upper and lower flange portions 3b and 3c, and the rear end portion of the power plant frame 3 is rigidly fixed to a mounting portion 2a of the differential 2 by bolts 8 at the upper and lower flange portions 3a and 3b. As shown in FIGS. 3 and 6, the plate members 5 and 6 are provided with openings 9 and 10 for inserting a bolt tightening tool T at the front and rear end portions of the power plant frame 3 where they respectively form the lower flange portion 3c and the upper wall of the closed cross-section.

A bight portion C is formed in the power plant frame 3 just behind the connection to the power unit 1 so that the power plant frame 3 is easily deformed at the bight portion C when an impact acts thereon. That is, the power plant frame 3 is substantially doglegged as viewed from the side. Though the bight portion C may be formed in any position in the longitudinal direction, it is preferred that the bight portion C be formed in the vicinity of the front end as in this embodiment in view of easiness of deformation. The upper and lower flange portions 3b and 3c are not vertically aligned with the propeller shaft 4 except the intermediate of the power plant frame 3, whereby the flange portions 3b and 3c of the power plant frame 3 cannot interfere with the propeller shaft 4 when the power plant frame 3 deforms.

Figure 10A:
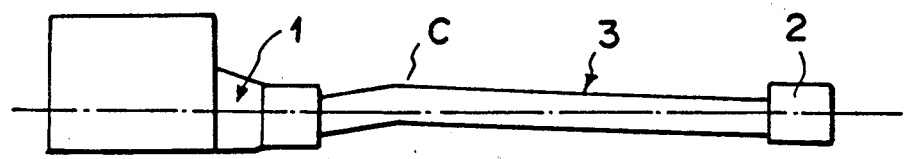
Figure 10B:
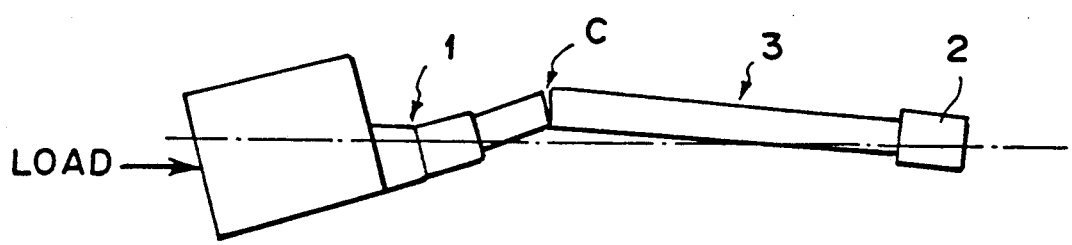

When a longitudinal impact acts on the vehicle body upon collision, for instance, the power plant frame 3 deforms at the bight portion C as shown in FIG. 10 and the impact force is thereby absorbed. As a result, the impact force is prevented from being directly transmitted to the differential 2 or the power unit 1.

Figure 8:
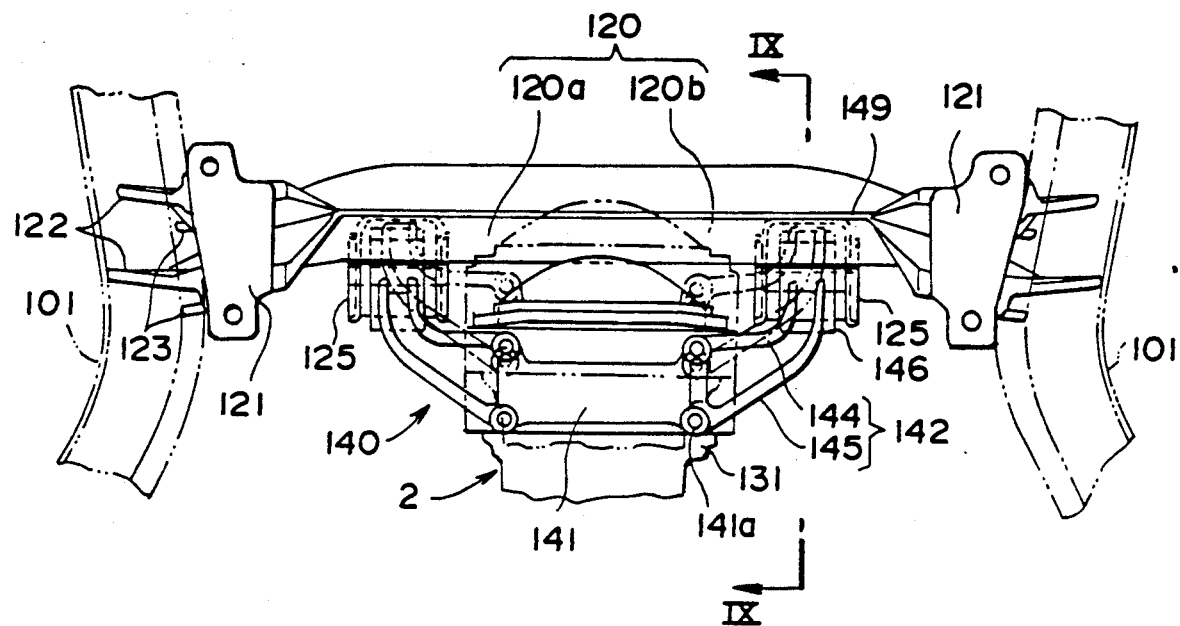
FIG. 8 is a plan view partly removed of FIG. 7.
Figure 9:
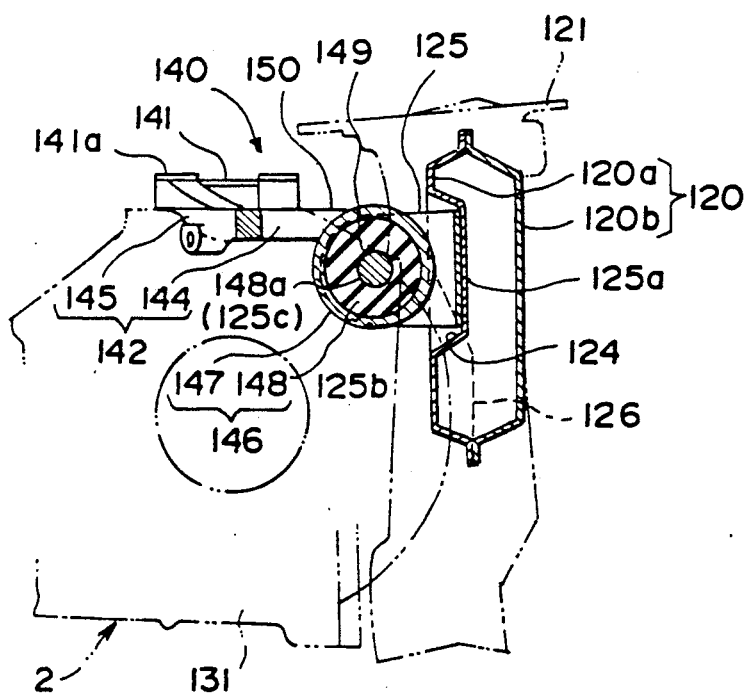
FIG. 9 is a cross-sectional view taken along line IX—IX in FIG. 8, FIGS. 10(A) and 10(B) are schematic side views for illustrating the principle of operation of the embodiment.

The structure for mounting the differential 2 will be described in detail with reference to FIGS. 7 to 9, hereinbelow.

The vehicle is provided with a double wishbone type suspension system 110, and left and right rear frames 101 and a sub frame 120 which extends in the transverse direction of the vehicle body are provided on the vehicle. The suspension system 110 comprises an upper control arm 111 which is substantially A-shaped and pivoted on the sub frame 115, the rear frame 101 and a wheel support 104 which supports for rotation a rear wheel 103; a first lateral link 112 which is pivoted on the wheel support 104 and a rear frame 101; a second lateral link 113 which is pivoted on the wheel support 104 and the sub frame 120; a trailing link 114 which is pivotally connected to the second lateral link 113 at one end; an auxiliary link 115 which is pivoted on the sub frame 120 at one end; and a shock absorber. The other ends of the trailing link 114 and the auxiliary link 115 are pivotally connected with each other by way of a bracket.

The sub frame 120 is formed of front and rear wall members 120a and 120b which respectively define the front and rear walls. The front and rear wall members 120a and 120b are welded together along their upper and lower edges to form a rigid closed cross-section except the left and right end portions. The upper edges of the front and rear wall members 120a and 120b are spaced from each other in the longitudinal direction at each end portion of the sub frame 120 and are connected by a reinforcement plate member 121. A bracket 122 for pivotally mounting one end of the upper control arm 111 is provided on the upper portion of each end portion of the front and rear wall members 120a and 120b. A bracket 123 for pivotally mounting one end of the second lateral link 113 is provided on the lower portion of each end portion of the front and rear wall members 120a and 120b. A pair of bracket mounting portions 124 in the form of recesses are formed on the front wall member 120a at portions near the left and right end portions. A bracket 125 which is substantially U-shaped in plan and has a rear wall portion 125a and a pair of side wall portions 125a is welded to each bracket mounting portion 124 at the rear wall portion 125a. Each of the side wall portions 125b is provided with a pin inserting hole 125c. An engaging recess 126 which conforms to the shape of the rear end portion of the differential 2 is formed in the front wall member between the left and right bracket mounting portions 124.

On the upper surface of a housing 131 of the differential 2 is provided an arm member 140 for mounting the differential 2 on the sub frame 120. The arm member 140 comprises a mounting portion 141, left and right arm portions 142 and a pair of cylindrical portions 146 which are respectively formed on the rear end portions of the arm portions 142. The arm member 140 is fixed to the housing 131 by four bolts 141a at the mounting portion 141.

Each of the arm portions 142 comprises a first arm 144 which extends rearward from the rear end of the side of the mounting portion 141 and a second arm 145 which extends from the front end of side of mounting portion 141. The first and second arms 144 and 145 are horizontal and flush with each other at their rear end portions and the cylindrical portion 146 are welded to the first and second arms 144 and 145.

The cylindrical portion 146 comprises a tubular member 147 and a rubber bushing 148 which is fitted in the tubular member 147 and bonded to the inner surface of the tubular member 147. The rubber bushing 148 is provided with a longitudinal through hole 148a. The left and right cylindrical portions 146 are inserted into between the side wall portions 125b of the respective brackets 125 and a pin member 149 is passed through the pin inserting holes 125c in the side wall portions 125b and the through holes 148a of each rubber bushing 148. In this manner, the differential 2 is pivoted on the sub frame 120.

Figure 7:
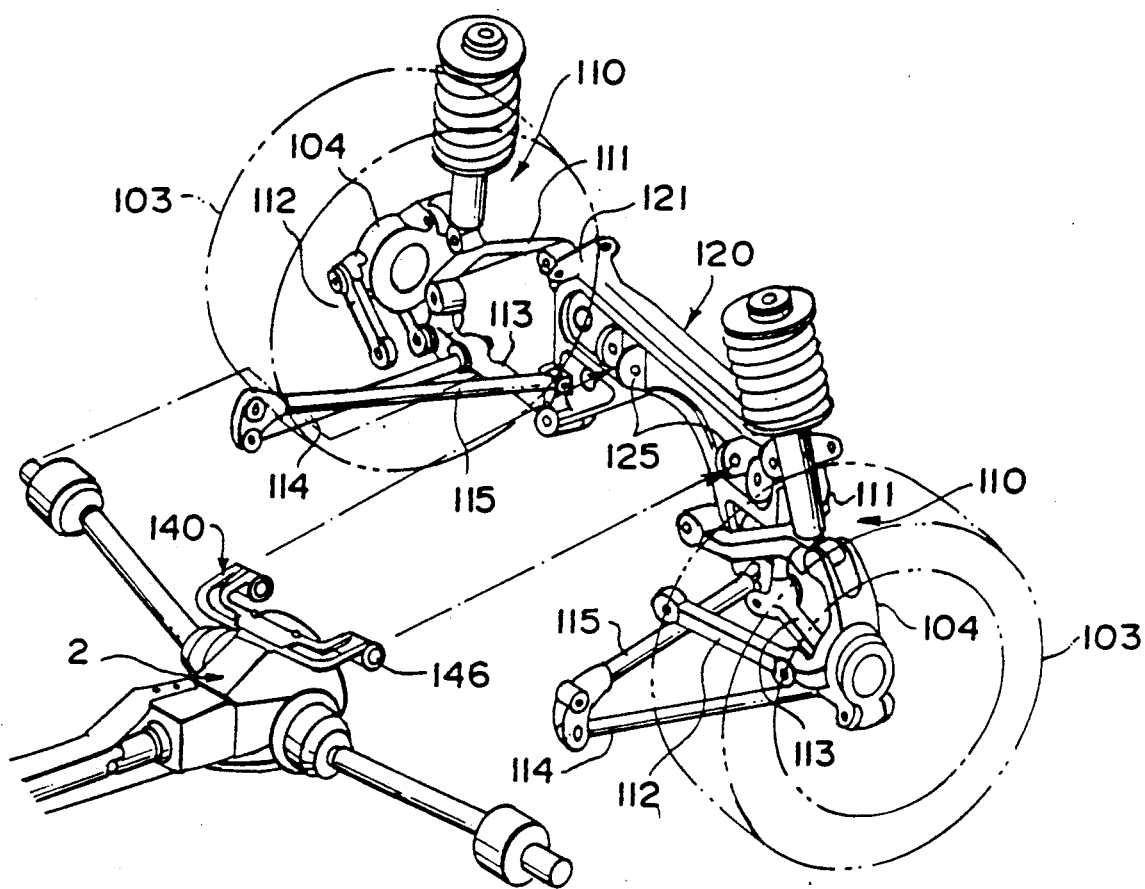
FIG. 7 is a perspective view showing in detail the structure for mounting the differential in the power train system shown in FIG. 1.

As clearly shown in FIG. 7, the differential 2 is pivoted about a horizontal axis (the pin member 149) which is positioned higher than the longitudinal axis of the power plant frame 3. Accordingly, when an impact force is transmitted to the differential 2 through the power plant frame 3 upon an head-on collision of the vehicle, the differential 2 swings downward about the pin member 149. This greatly stresses in bending the portion of the power plant frame 3 near the connection of the power plant frame 3 to the differential 2, and bends the power plant frame 3 there, whereby the impact force is further effectively absorbed.

Figure 11A:
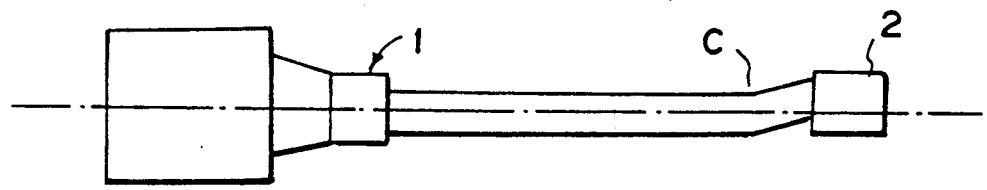
FIGS. 11(A) and 11(B) are schematic plan views and FIG. 11(C) is a schematic side view for illustrating the principle of operation of another embodiment.
Figure 11B:
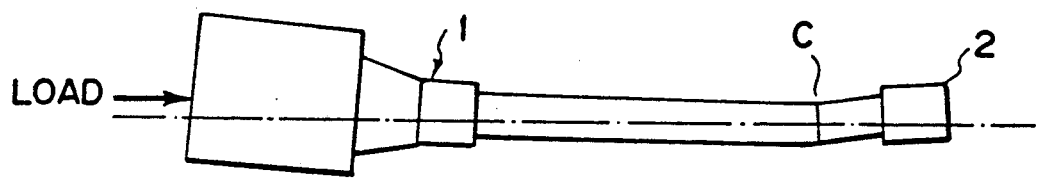
Figure 11C:
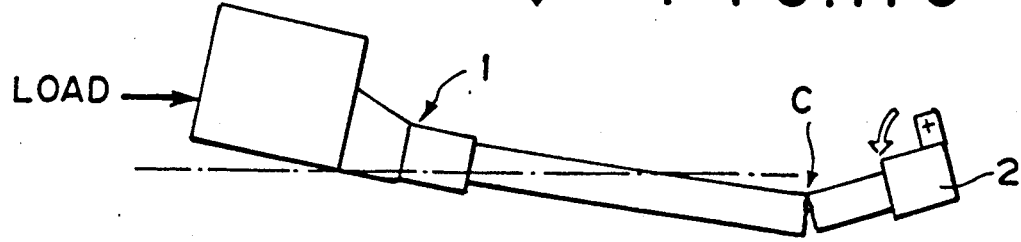

Though the bight portion C is formed in the power plant frame 3 at a portion near the front end of the power plant frame 3, it is preferred that the bight portion C be formed near the connection of the power plant frame 3 to the differential 2 as shown in FIG. 11 in the case the the differential 2 is mounted so that it can swing about a horizontal axis which is positioned higher than the longitudinal axis of power plant frame 3. That is, when a longitudinal impact acts on the vehicle body upon collision, for instance, the power plant frame 3 deforms and cracks at the bight portion C as shown in FIG. 11(B). Accordingly, when the differential 2 swings downward about the pin member 149 and stresses in bending the bight portion C, the power plant frame 3 can be broken much more easily. In this connection, the bight portion C defines a means which makes the longitudinal axis of the power plant frame 3, along which the rearward impact force is transmitted rearward, deviate from the connection of the power plant frame 3 to the differential 2. With respect to the structure shown in FIGS. 1 and 2, the longitudinal axis of the power plant frame 3 may be considered to be a line which passes through the center of the power plant frame 3 substantially at the middle with respect to the length thereof, and the connection of the power plant frame 3 to the differential 2 may be considered to be on the line joining the two bolts 8 which are in alignment with each other in the longitudinal direction of the vehicle body.

I claim:

1. A power train system for a vehicle comprising:
   a vehicle body;
   a power unit positioned in a front portion of the vehicle body;
   a differential positioned in a rear portion of the vehicle body and resiliently connected to the vehicle body by way of at least one cylindrical rubber bushing member;
   a propeller shaft extending between the power unit and the differential for transmitting output power of the power unit to the differential; and
   a power plant frame having a longitudinal axis extending between the power unit and the differential and being rigidly connected at one end to the power unit and at the other end to the differential, the power plant frame having a substantially U-shaped cross-section and being flexurally rigid and torsionally resilient, and the cylindrical rubber bushing member comprises an outer tubular member fixed to the differential, a shaft member fixed to the vehicle body having an axis extending horizontally in a transverse direction of the vehicle body, and a rubber member interposed between the outer tubular member and the shaft member;
   wherein the axis of the shaft member is positioned at a height higher than a height of the longitudinal axis of the power plant frame with respect to an underside of the vehicle body.

2. A power train system as defined in claim 1, wherein said differential is connected to the vehicle body by a plurality of said cylindrical rubber bushing members, said cylindrical rubber bushing members being spaced from each other in a transverse direction of the vehicle body with respective axis of the shaft members of the cylindrical rubber bushing members being substantially in alignment with each other.

3. A power train system as defined in claim 2, further comprising a suspension cross link member supportingly connected to left and right rear wheels of the vehicle and a suspension cross member supportingly contacting said suspension link members, wherein the shaft member of each of the cylindrical rubber bushing members extends in a transverse direction of the vehicle body and is fixed, at opposite ends, to said suspension cross member.

4. A power train system as defined in claim 3, further comprising a bracket for supporting respective ends of the shaft members, said bracket being fixed to a front face of the suspension cross member.

5. A power train system as defined in claim 4, further comprising an arm member for fixing said outer tubular member of each of said cylindrical rubber bushing members to a casing of the differential.

6. A power train system as defined in claim 4, wherein said outer tubular members of each of the cylindrical rubber bushing members is fixed to a casing of the differential by way of an arm member.

7. A power train system as defined in claim 2 wherein a connection of the power plant frame to the differential is offset from a longitudinal axis of the power plant frame in a transverse direction of the vehicle body as viewed from above so that an impact load input into the power plant frame upon collision generates a bending moment for bending the power plant frame in a plane at a portion of the power plant frame near the connection of the power plant frame to the differential.

8. A power train system as defined in claim 1, wherein said power plant frame includes inner and outer plate members connected to one another, the outer plate member comprising upper and lower flange portions and a vertical portions which connects the upper and lower flange portions with said outer plate member surrounding the inner plate member.

9. A power train system as defined in claim 8 wherein a lower portion of said inner plate member is connected to the lower flange portion of the outer plate member, an upper portion of the inner plate member is connected to the upper flange portion of the outer plate member, and a portion of the inner plate member is connected to the vertical portion of the outer plate member, thereby forming a closed cross-section in at least a predetermined portion of the power plant frame.

10. A power train system as defined in claim 9 wherein said propeller shaft is disposed on an open side of the power plant frame.

11. A power train system for a vehicle comprising:
    a power unit positioned in a front portion of a vehicle body;
    a differential positioned in a rear portion of a vehicle body;
    a propeller shaft interconnecting the power unit and the differential for transmitting engine output power to rear wheels of the vehicle; and
    a power plant frame rigidly connecting a rear portion of the power unit to a front portion of the differential, the power plant frame having a substantially U-shaped cross-section comprising inner and outer plate members connected to one another, the outer plate member comprising upper and lower flange portions and a vertical portion which connects the upper and lower flange portions, such that said outer plate member surrounds the inner plate member, said frame being flexurally rigid and torsionally flexible and substantially doglegged in a shape so that a longitudinal axis thereof is offset in a direction from a line joining the connections of the power plant frame to the power unit and the differential.

12. A power train system as defined in claim 11, wherein a lower portion of said inner plate member is connected to the lower flange portion of the outer plate member, an upper portion of the inner plate member is connected to the upper flange portion of the outer plate member, and a portion of the inner plate member is connected to the vertical portion of the outer plate member, thereby forming a closed cross-section in at least a predetermined portion of the power plant frame.

13. A power train system as defined in claim 12, wherein said propeller shaft is disposed on an open side of the power plant frame.

14. A power train system as defined in claim 13 wherein said propeller shaft is at least partly positioned in a space surrounded by the inner and outer plate members of the power plant frame.

15. A power train system as defined in claim 13 wherein front end portions of the upper and lower flange portions of the power plant frame are fixed to the power unit by bolts and rear end portions of the upper and lower flange portions of the power plant frame are fixed to the differential by bolts.

16. A power train system as defined in claim 15 wherein said outer and inner plate members of the power plant frame include openings therein through which a tool for tightening said bolts may be inserted.

17. A power train system as defined in claim 11 wherein said power plant frame is doglegged as viewed from a side of the vehicle body.

18. A power train system for a vehicle comprising:
a power unit positioned in a front portion of a vehicle body;
a differential positioned in a rear portion of the vehicle body resiliently connected to a side member of the vehicle body by at least one cylindrical rubber bushing member, said cylindrical rubber bushing member comprising an outer tubular member fixed to the differential, a shaft member fixed to the side member and extending horizontally in a transverse direction of the vehicle body, and a rubber member interposed between the outer tubular member and the shaft member, the rubber bushing member being positioned higher than a center of the differential with respect to the ground;
a propeller shaft interconnecting the power unit and the differential for transmitting engine output power to rear wheels of the vehicle; and
a power plant frame rigidly connecting a rear portion of the power unit to a front portion of the differential, the power plant frame having a substantially U-shaped cross-section, said frame being flexurally rigid and torsionally flexible and substantially doglegged in shape so that a longitudinal axis thereof is offset in a direction from a line joining the connections of the power plant frame to the power unit and the differential.

* * * * *